Sept. 29, 1936.  A. BOYNTON  2,055,465
PRESSURE RELIEF VALVE
Filed Sept. 30, 1932

Alexander Boynton Inventor

By Jesse R. Stone
&
Lester B. Clark
Attorneys

Patented Sept. 29, 1936

2,055,465

UNITED STATES PATENT OFFICE 2,055,465

PRESSURE RELIEF VALVE

Alexander Boynton, San Antonio, Tex., assignor to Chas. A. Beatty, San Antonio, Tex.

Application September 30, 1932, Serial No. 635,542

2 Claims. (Cl. 137—53)

My invention relates to pressure relief valves adapted to automatically operate to relieve excessive pressures within a container. It finds its particular application to use on boilers, pipe lines, oil and gas wells and similar containers in which gas or liquids are confined under pressure.

It is an object of the invention to provide a valve which is supported upon a longitudinally extensible member adapted to be acted upon by the pressure in the container to control the position of the valve relative to the emergency outlet.

I desire to provide a bellows or diaphragm element to be supported in a chamber connected with the container, well, or line which will be acted upon by the pressure fluid to be contracted or elongated by the varying pressures therein to raise or lower the valve relative to the seat in the outlet. The invention resides in the particular structure of the controlling device which determines the position of the valve in the vent to atmosphere, or discharge into another line or container.

Figure 1:
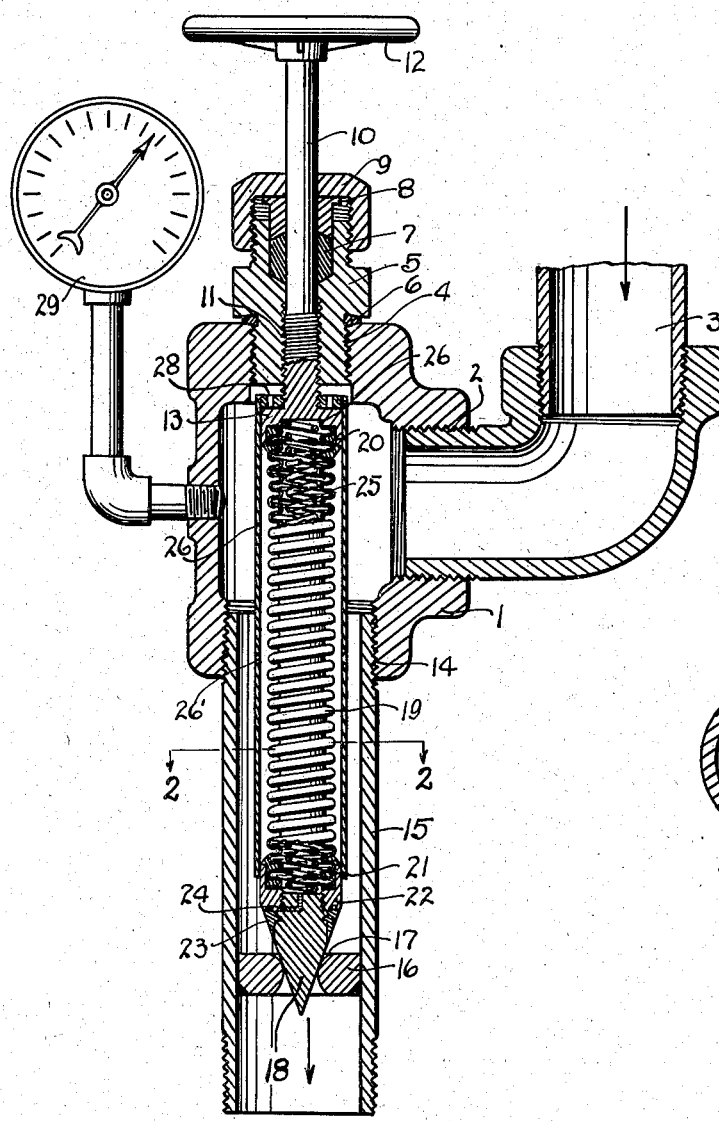
Figure 2:
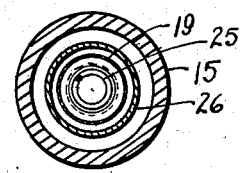

In the drawing herewith, Fig. 1 is a central longitudinal section through a structure employing my invention; and Fig. 2 is a transverse section on the plane 2—2 of Fig. 1.

In the drawing I have shown a fitting 1, which has a threaded opening 2 for connection in a line 3, which is to be understood as coming from a well, pipe line, boiler or other container in which fluid under pressure exists or may exist. The fitting is T-shaped having one end formed with a threaded opening 4 into which is screwed a plug 5. Said plug is formed with a lower shoulder between which and the outer end of the fitting is clamped a packing washer 6. The outer end of the plug is recessed to form a stuffing box including a packing member 7, a gland 8 and a threaded cap 9 bearing on the gland to force the same into contact with the packing.

A rotatable stem 10 is extended inwardly through the stuffing box and has a threaded engagement within an axial passage 11 through the plug. The outer end of the stem has a handle 12 thereon by means of which the stem may be rotated to screw the same longitudinally in the plug to move the control head 13 on the stem longitudinally in the fitting 1.

The other arm of the T is threaded at 14 for connection with the tubular housing 15. Said housing has adjacent its lower end an annular wall 16, which is beveled at 17 adjacent an opening to provide a seat for the tapered valve member 18.

Said wall closes the lower end of the housing except for the valve controlled opening therethrough forming the seat 17. The housing is threaded at its lower end for engagement with a fluid conducting line or container for the excess fluid.

The valve 18 is mounted at the lower end of a longitudinally extensible bellows or multiple diaphragm member 19. Said bellows member has a spiral corrugation thereon extending from the upper to the lower end and is adapted to be compressed or expanded to extend or contract the same longitudinally. The corrugations on the bellows may be ring-shaped instead of spiral, as will be obvious, as both forms of bellows may be purchased. Said bellows member is made up of thin sheet metal and the walls thereof may be composed of one or more thicknesses of metal. The upper end is soldered or welded at 20 within the lower end of the head 13 upon the stem 10. It makes a fluid-tight seal with said stem to prevent leakage of fluid at that point. The outer end of the bellows member is welded at 21 to a longitudinally extending flange upon the ring 22 threaded into connection with the valve head 18. It will be noted from Fig. 1 that said valve head is screwed within the ring 22 and is sealed into engagement therewith by a bond of soldering or welding material shown at 23. There is a duct or channel 24, formed in the valve head, which, before the welding material is placed in position, forms an outlet from the interior of the bellows member.

There is a spring 25 within the bellows member fitting at one end within a recess 26 in the head 13 of the stem. At the lower end it bears against the upper shank of the valve head 18. It is under slight compression tending to elongate the bellows and hold the valve within the seat 17.

In assembling the bellows, it is soldered, brazed or welded to the head 13 of the stem, and to the ring 22 at its opposite end, the valve head 18 being removed. The spring 25 is then placed in position and the bellows arranged with the valve end upwardly. Liquid, such as glycerine, is then poured within the bellows member to entirely fill the same. The valve head 18 is then screwed in position and the bellows member is compressed longitudinally to its maximum compression in ordinary operation. Excess glycerine will then escape through the channel 24. The bellows will then be released and the spring will tend to force it back to its original position. This it will do except for a slight permanent set in the walls of the bellows member, due to the compression of the same. The bond of soldering, brazing or welding material 23 will then be applied and the bellows assembly will be ready for installation as shown in Fig. 1.

I provide a guide sleeve 26 about the bellows member to protect the same against erosion of fluids and abrasive substances therein while in use. This sleeve 26 has a threaded engagement at its upper end with the ring or washer 28, which is preferably threaded above the head 13 upon the stem 10. The sleeve extends downwardly in spaced relation relative to the bellows member and has its lower end telescoping over the ring 22, to which the lower end of the bellows is connected. There is a slidable fit between the sleeve and the head which will not interfere with the movement of the valve. It is intended that the fluid under pressure in the housing will find access around the lower end of the guide sleeve and also through openings 26' in the wall of the guide sleeve, to the bellows member, so that the said member may be compressed or expanded by the varying pressures within the housing. I may employ an indicator in the shape of a gauge 29 to show the pressures within the safety device.

In operation the valve will be adjusted through the stem 10 to engage within the seat 17 under pressures which are approaching the maximum for safety or such as may be desired. The valve will then close the outlet and will prevent the escape of fluid from the line when said pressures are not excessive. The device will operate automatically thereafter and when fluid in the line 3 attains a maximum pressure which is above the limit of safety or more than desired, the said pressure will be exerted against the walls of the multiple diaphragm 19 and collapse the same slightly, tending to shorten the length of the bellows member and raise the valve from its seat to allow escape of the pressure fluid. When the pressures within the housing have declined to within a limit of safety to that which may be desired the bellows member will be again extended longitudinally to close the valve.

The use of some such liquid as glycerine within the bellows member allows this device to be used in situations where high pressures are encountered. There is a slight cushion of air which enters within the bellows after the same is compressed and allowed to extend in assembling. The bellows is, however, nearly full of glycerine or other liquid and when the bellows is partially collapsed under pressures which are excessive, tending to rupture the bellows or diaphragm, the glycerine on the interior will form a support for the walls, preventing collapse and resisting pressures on the exterior of the bellows member much in excess of those ordinarily considered safe. It is not essential to have a cushion of air above the liquid filler. A vacuum there will cause the bellows to cushion upon the liquid instead of air and the operation is much the same. I have found that bellows with a wall thickness of .008 of an inch will withstand pressures as high as five thousand pounds per square inch without damage.

The spring which is employed should be considerably longer than the bellows in order that the force required to compress the spring in assembly will not increase as the spring is compressed as rapidly as this force would increase were the free length of the spring not greater than the free length of the bellows. With this safety valve thus constructed I have produced a structure in which the valve is delicately adjusted to operate positively when the pressures become excessive within the well, boiler, line, or other container. It will be capable of adjustment for different pressures with no further manipulation than the rotation of the stem 10. It is simple and reliable in construction and is efficient in operation.

What I claim as new is:

1. A pressure relief valve including a housing adapted to be connected with a container of fluid under pressure, a bellows-shaped metal diaphragm member longitudinally of said housing, an outlet in said housing, a valve on the lower end of said bellows member adapted on compression of said member to open said outlet, a stem to which the other end of said bellows member is non-rotatably fixed, means to adjust said stem and bellows member longitudinally to set said valve, and means in said bellows member including a charge of liquid incompletely filling said member to resist undue compression thereof under pressure.

2. A pressure relief valve including a housing adapted to be connected with a container of fluid under pressure, a bellows-shaped metal diaphragm member longitudinally of said housing, an outlet in said housing, a valve on the forward end of said bellows member controlling said outlet, a stem to which the other end of said bellows member is fixed, a protecting sleeve on said stem enclosing said bellows member, means to adjust said stem and bellows member longitudinally to set said valve and a spring in said bellows member tending to elongate said member to hold said valve seated.

ALEXANDER BOYNTON.